(No Model.)
J. W. PURSLOW.
MACHINE FOR TWISTING HAY ROPE.
No. 275,267. Patented Apr. 3, 1883.
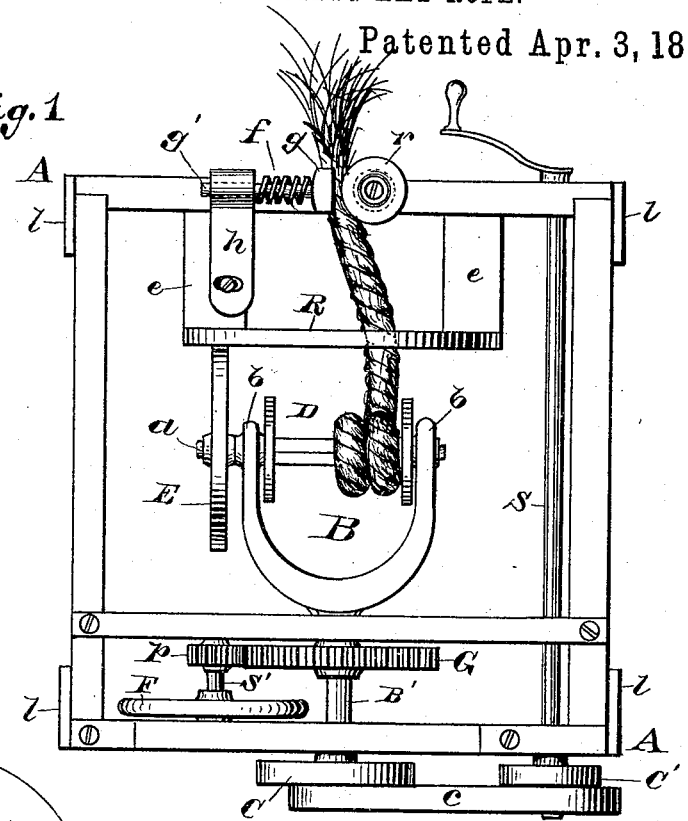
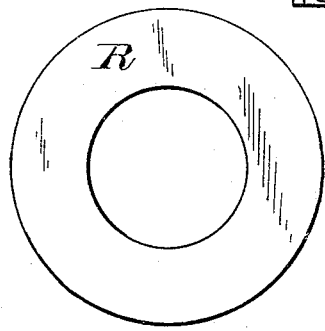
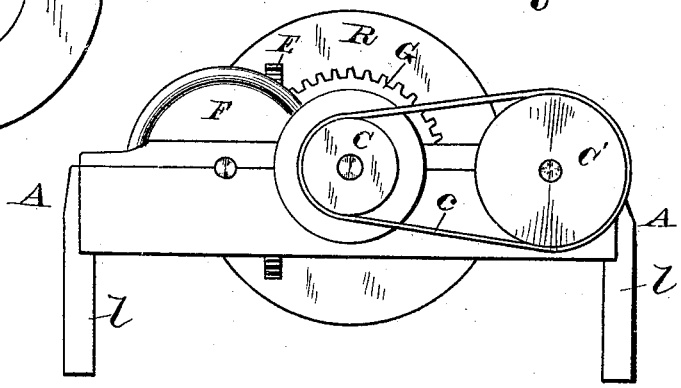
Attest,
Chas. Kressman
S. A. Staley
Inventor
John W. Purslow
BY
H. S. Harrison
Attorney.

UNITED STATES PATENT OFFICE.

JOHN W. PURSLOW, OF DURANGO, COLORADO.

MACHINE FOR TWISTING HAY ROPE.

SPECIFICATION forming part of Letters Patent No. 275,267, dated April 3, 1883.

Application filed May 4, 1882. (No model.)

*To all whom it may concern:*

Be it known that I, JOHN W. PURSLOW, a citizen of the United States of America, residing at Durango, in the county of La Plata and State of Colorado, have invented certain new and useful Improvements in Machines for Twisting Hay Rope, of which the following is a specification.

My invention relates to machines for twisting hay rope, the object of my invention being to provide a simple and inexpensive machine whereby hay may be twisted into a rope which is afterward to be tied in knots or bunches and used for fuel.

To this end my invention consists in the combination of mechanism as illustrated in the accompanying drawings, in which—

Figure 1 is a plan view of my machine; Fig. 2, a rear elevation, and Fig. 3 a detail view of the same.

Similar letters of reference refer to similar parts throughout the several views.

In the drawings, A A represent the main frame, which is made of wood or other suitable material, and supported on suitable legs, *l*. Supported in the frame A A is a Y-shaped piece, B, having a shaft, B', that is journaled in suitable bearings. At the rear end of shaft B' is secured a cone-pulley, C, and near the middle of its length a gear-wheel, G. The gear-wheel G meshes with a pinion, *p*, on a short shaft, S', also supported in bearings on main frame A A, and carrying a fly-wheel, F. In the ends of the prongs *b b* of the Y-shaped piece B is journaled a shaft, *a*, on which is a spool, D, on which the finished rope is wound, as hereinafter set forth. Secured on one end of the shaft *a* is a friction-wheel, E, which bears against the face of a ring, R, (see Fig. 3,) secured by lugs *e e* to the main frame A A.

*r* is a grooved wheel secured to the main frame A A in such a manner that it is free to turn on its axis. Opposite the grooved wheel *r*, and pressed toward it by a spring, *f*, is a grooved slide, *g*, on the end of a rod, *g'*, the end of which slides in the adjustable piece *h*, secured to lug *e* by means of a slot and set-screw in such a manner that it may be adjusted to change the tension of the spring *f*.

S is the shaft to which the power is applied by means of a crank, foot-treadle, or in any other appropriate manner. It is supplied at the rear end with a cone-pulley, C', similar to the one C, referred to above, and is connected therewith by means of a belt, *c*.

The operation is as follows: A bunch of hay is twisted slightly to start the rope, and one end secured on the spool D, the other end passed through the ring R, and placed between the grooved slide *g* and grooved wheel *r*, where it is firmly held by the spring *f*. The shaft S is then revolved, and through belt *c* revolves the Y-shaped piece B, containing the spool D, and thus twists the hay attached thereto into a rope. As the piece B revolves, the friction-wheel E rolls around on the surface of ring R, and through shaft *a* turns the spool D, and thus winds the rope thereon as fast as it is finished, the hay being supplied at the other end as fast as necessary. The gear-wheel G, meshing with the pinion *p*, gives motion to the fly-wheel F, which serves to keep the motion steady. The cone-pulleys C and C' furnish the means of varying the speed of the machine when desired. When the spool D is full it may be removed and an empty one substituted by withdrawing the shaft *a*; or, if desired, the rope may be unwound therefrom without removing the spool.

The rope thus made is to be tied into knots or otherwise and used as fuel.

Having thus described my invention, what I claim as new, and desire to secure by Letters Patent, is—

1. The combination of the frame A A, the Y-shaped piece B, the shaft *a*, adapted to carry the spool D, the wheel E, supported on said shaft, the ring R, having lugs *e e*, the piece *h*, adjustably attached to one of said lugs, the slide *g*, provided with spring *f* and rod *g'*, supported by said piece *h*, the grooved wheel *r*, mounted on the main frame, and means for rotating the Y-shaped piece B, all substantially as and for the purpose described.

2. The combination of the frame A A, ring

R, provided with lugs e e, the grooved wheel r, slide g, having rod g' and spring f, Y-shaped piece B, having shafts a and B', wheel E, mounted on the shaft a, cone-pulley C, and gear-wheel G, mounted on the shaft B', shaft S', carrying pinion p and fly-wheel F, the shaft S, cone-pulley C', belt c, and means for rotating the main shaft S, all substantially as described.

In testimony whereof I affix my signature in presence of two witnesses.

JOHN W. PURSLOW.

Witnesses:
   J. C. NYM,
   R. H. MCFADDEN.